April 17, 1945. H. L. LANSING Re. 22,632

UNBALANCED SPLICE BAR WITH BALANCED RATIOS

Original Filed Nov. 12, 1938 2 Sheets-Sheet 1

Inventor

Horace L. Lansing,

By D. P. Wolhaupter

Attorney

April 17, 1945. H. L. LANSING Re. 22,632

UNBALANCED SPLICE BAR WITH BALANCED RATIOS

Original Filed Nov. 12, 1938 2 Sheets-Sheet 2

Inventor

Horace L. Lansing,

By D. P. Wolhaupter

Attorney

Reissued Apr. 17, 1945

Re. 22,632

UNITED STATES PATENT OFFICE 22,632

UNBALANCED SPLICE BAR WITH BALANCED RATIOS

Horace L. Lansing, Rutherford, N. J., assignor to Poor & Company, New York, N. Y., a corporation of Delaware Original No. 2,189,009, dated February 6, 1940, Serial No. 240,153, November 12, 1938. Application for reissue September 29, 1944, Serial No. 556,470

6 Claims. (Cl. 238—243)

This invention relates to that type of splice bars for railway rails of the unsymmetrical and unbalanced type, that is, of the type having a preponderance of metal in its head to provide top and bottom chords of unequal strength, and its primary object is to provide a splice bar of this kind in which there is definitely embodied a proportional distribution of metal in the geometrically unsymmetrical portions of the upper and lower members of the bar to provide analytical symmetry by a balancing of the metal distribution ratios about its middle line, that is, as to I/S ratio values and S/A ratio values above and below the middle line of the bar.

In the attainment of this object there is produced, according to the present invention, a geometrically unsymmetrical splice bar unbalanced as to head and base strength (modulus values) but balanced as to its said metal distribution ratios about the middle line, the resulting construction better adapting a bar of this type and kind to withstand the strains to which it is subjected in service, while at the same time, effecting a very substantial saving in metal and consequently affording a bar which is lighter in weight, and more economical to produce than comparable, known splice bars for use on the same weight and type of railway rail.

It has been discovered by experiment and test that according to the principles of the present invention, as distinguished from the principles and teachings of the Braine Reissue Patents Nos. 16,311 and 16,506, a more efficient and materially lighter splice bar, unbalanced as to head and base strength, may be produced than known bars of the same type for the same weight and type of rail. Accordingly, this invention contemplates a geometrically unsymmetrical and unbalanced splice bar section which is substantially balanced as to its metal ratio values above and below its middle line as distinguished from the prior art, in which this distribution of metal ratio values has been about the neutral axis of the bar. Such a bar, as provided by the present invention, efficiently and effectually resists the strains set up therein, is lighter and therefore less costly than comparable, known splice bars, and not only possesses all requisite base strength, but head strength in excess of its base strength and also in excess of the head strength of comparable, known splice bars, whereby it more efficiently serves its purpose than comparable, known splice bars.

For an understanding of the improvements comprising the present invention an understanding of the development of modern splice bars is desirable. Early angle bars possessed decided predominance of strength in the base due to the use of a heavy base flange. Later, by decreasing the size of the base flange and by adding a projecting rib on the head, the efficiency of angle bars was materially enhanced, as the modulus values of the top and bottom chords of the bar were made more nearly equal without increasing the weight of the bar. In this connection, greatest efficiency in design in truly balanced bars was attained according to the teachings of Reissue Patents Nos. 16,311 and 16,506, granted to B. G. Braine on August 6, 1926, and December 21, 1926, respectively. According to the teachings of these patents it was possible to obtain analytical symmetry in a geometrically unsymmetrical bar and thereby obtain equality in top and bottom chord modulus values, with consequent high efficiency, by virtue of equal strength in the head and the base of a bar of minimum weight. With the advent of higher and heavier rails, affording additional fishing space, it became possible to shorten the base flange to an extent to lie entirely inwardly of the edge of the rail base and still maintain adequate stiffness and strength. This development resulted in the well known toeless bar, respecting which greatest efficiency in design was obtained under the teachings of the Armstrong Patent No. 1,654,397 of December 27, 1927, by the balancing, or near balancing, of modulus values of the top and bottom chords of the bar, and an accompanying balancing of inertia and ratio values relative to the neutral axis which in this Armstrong patent is coincident with the middle line, which is necessary in a bar balanced according to the teaching of the Armstrong patent. Thus, until the present invention, splice bars had progressed from the early angle bar, stronger in the base, to a balanced bar with equal, or approximately equal, strength in the head and base. This latter development would be ideal if the bar were to function as a simple beam. But, in service, rail joint bars are subjected to complex stresses and severe strains, usually to a far greater extent in the head than in the base, because the top bearing surface of a bar has its load bearing stresses and maximum compressive stresses at its center, where it also is subjected to cutting by the rail ends; whereas, the base bearing surface has only maximum tensile stress at its center. In other words, the reason for making a joint bar stronger in the head is due to the fact that there are two compressive stresses on the head of the joint bar. One of these stresses is due to bending under direct loading and the other is due to transferring the compression from the head of the rail to the head of the joint bar, and, for that reason it is necessary to have greater strength in the upper portion of the joint bar. This condition requires that a bar have a preponderance of strength in its head or top member. At the same time, considerations of economy and efficiency demand that a bar be balanced as to the I/S and S/A ratios of its top and bottom portions. To provide such a bar by developing same about its neutral axis is not feasible. On the other hand, it has been determined that such a bar may practically be produced by middle line development, leaving the neutral axis to fall where it may in the finished bar. Accordingly, the object of the present invention, more particularly stated, is to provide a splice bar of the toeless type which, while geometrically unsymmetrical in section, is balanced, or substantially balanced, as to its I/S and S/A ratios above and below its middle line, the said middle line in all cases subject to this invention being spaced a definite distance from the neutral axis of the bar; which includes a greater amount of metal in its head than in its base; which is stronger in its head than in its base and also stronger in its head than comparable, known splice bars; which possess all requisite base strength, and which, at the same time, is appreciably lighter and therefore less costly than comparable, known splice bars.

With the foregoing and other objects in view, which will become more fully apparent to those skilled in the art as the invention is better understood, the same consists in the novel splice bar construction as will be hereinafter more fully described, illustrated in the accompanying drawings and defined in the appended claims.

In the accompanying drawings, wherein like characters of reference denote corresponding parts in the different views.

In developing the present new and advantageous splice bar there are first determined, with reference to a rail which the finished bar is intended to fit, the boundaries within which the finished bar must be contained, making due allowance for the clearances which must be observed between the finished bar and the rail, and wheel flanges. In this connection, since the bar is of the toeless type, the outer limit of the base of the bar is inwardly of the outer edge of the rail flange. On the other hand, joint bolt length and other considerations determine the limit beyond which the outer or bolting face of the web of the bar may not extend, and enable the definite fixing of the plane of the outer or bolting face of the web with respect to the rail; required clearances of the head and the base of the bar from the rail web determine the inner limits of the head and of the base of the bar; the required thickness of the web of the bar is known and therefore the inner limit of the web is determined with reference to the outer or bolting face thereof, and required wheel flange clearance determines the limit upwardly beyond which the outer portion of the head of the bar may not extend. As to the outer face of the head of the bar, this has no limit and its disposition is a result of making the head of a width to obtain the desired preponderance of strength therein, as compared with the base of the bar.

Figure 1:
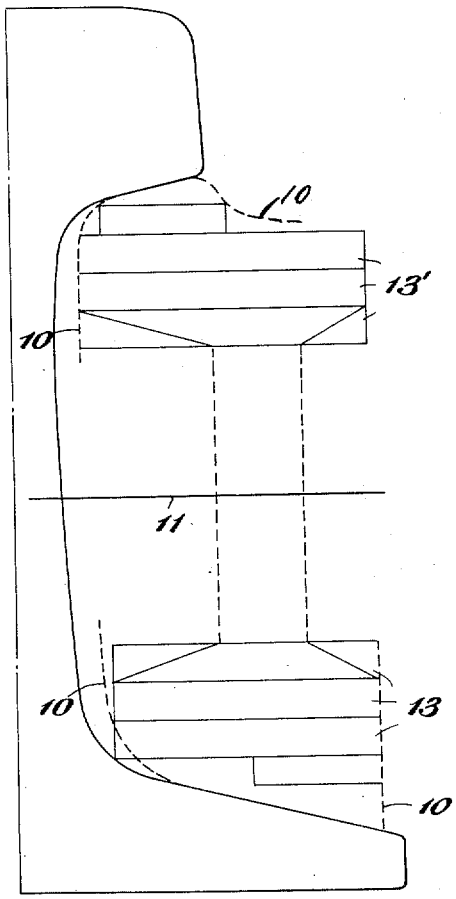
Figures 1 and 2 are diagrammatic views illustrating the method of predetermining the sectional shape of a splice bar embodying the features of the invention.

After the boundaries stated have been established, as indicated by the dotted lines 10 in Fig. 1, and which include inner and outer boundaries for the base of the bar, an inner boundary for the head of the bar, and a boundary for wheel flange clearance, a middle line 11 is established midway between the extreme top and the extreme bottom of said boundaries.

Then, below the middle line 11, the boundary-line-enclosed area for the base of the bar is, as nearly as practicable, completely blocked into zones 13 extending from the inner to the outer boundary lines 10 and of such depths and lengths that corresponding or proportional zones 13' may conveniently be outlined equal distances above the middle line 11 within the limitations of the head boundaries of the bar, with their inner ends disposed adjacent to the aforesaid inner boundary line of the head of the bar. In depth, related zones 13, 13' are maintained equal, but the zones 13' are increased in length as compared with the zones 13 by amounts to afford in the head of the bar the desired preponderance in weight and strength in the head as compared with the base. In this way there is obtained what may be termed a "nucleus" N of the bar to be produced, which nucleus has proportional amounts of metal spaced equal distances above and below the middle line 11 and comprising, generally speaking, the major portions of the areas of the head and the base of the nucleus.

Figure 2:
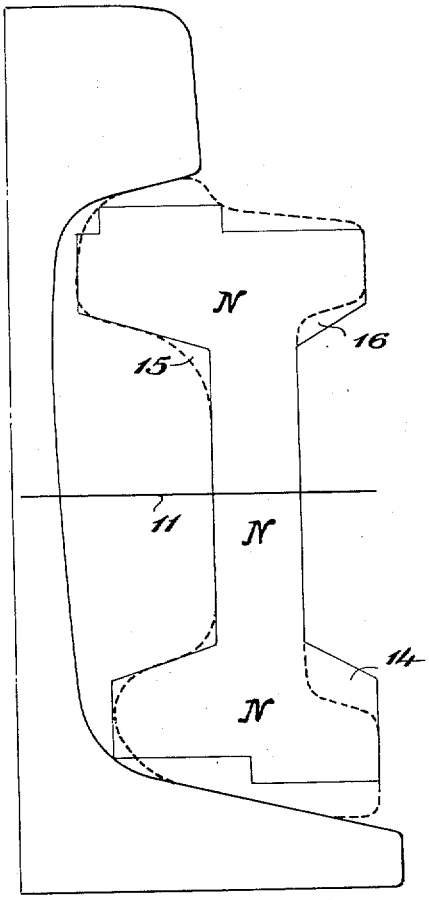

Following blocking of the top and bottom areas of the nucleus in the manner described, the final, irregular, cross sectional shape of the bar to be produced is outlined around said nucleus as shown in Fig. 2. This results, as is apparent, in a disproportion of areas in the finished bar outline above and below the middle line of the nucleus, because, in outlining the finished shapes of the head and the base of the bar, more area is required to be added at the bottom of the nucleus than at the top thereof. To correct this, an area, indicated as 14, is removed from the upper, outer portion of the base of the nucleus. On the other hand, to correct for the addition of a fillet 15 added to the under, inner side of the head of the nucleus, a small area, designated as 16, is removed from the lower, outer portion of the head of the nucleus. Thus, the desired proportional distribution of areas above and below the middle line 11 are maintained in the finished bar and therefore the finished bar, while geometrically unsymmetrical, is substantially balanced as to its physical property ratios above and below its middle line, or, in other words, is substantially symmetrical analytically and therefore is stronger in its head than in its base. At this point, as a matter of terminology it is of course understood that the physical properties of a joint bar are area (A), and the static moment (S). This moment is the sum of the products obtained by multiplying each element of the area by its distance from the axis. The moment of inertia (I). This moment is the sum of the products obtained by multiplying each element of the area by the square of its distance from the axis. Section modulus (S/M) is the moment of inertia divided by the distance from the axis to the most remote point of the section. The maximum stress at the extreme fibre equals the bending moment divided by the section modulus. The section modulus is the index of strength of the section. The essence of the invention is in making the section modulus of the head of the joint bar stronger than that of the base, at the same time making the ratios of the physical properties in substantial balance or substantial equivalence in the upper and lower halves of the bars. This is respectively above and below the middle line of the bar.

In the present splice bar the middle line and the neutral axis are always spaced a distance apart, and by making use of the balancing of ratios about the middle line, the location of the neutral axis relative to the middle line for any given percentage of greater top than bottom strength of the bar, is automatically determined. The modulus values are computed about the neutral axis, and if no error has been made the top modulus values will exceed the bottom modulus values by the predetermined percentage of difference, and no unnecessary amount of metal will be used. That is to say, the present invention is predicated on a novel economical distribution of metal which provides a rail joint bar wherein the percentage of difference in the top section modulus is materially greater than the bottom section modulus, as compared with bars of the patents of the prior art described herein, to provide a bar which is stronger in the head than the foot, and the physical property ratios of the top and bottom portions of the bar are substantially balanced about the middle line.

To illustrate: let it be assumed that a bar to be produced in accordance with the invention is to have 10% greater strength in its top than in its bottom portion. Immediately the neutral axis will be located. It will lie a distance above the middle line 5% of the distance from the middle line to the extreme top fibre. Then, if the zones 13′ are made 20% longer than the zones 13 and the bar is completed in this manner so that the physical property ratios top and bottom are kept in balance about the middle line, neutral axis calculations will show 10% greater modulus values in the top than in the bottom of the bar.

Figure 4:
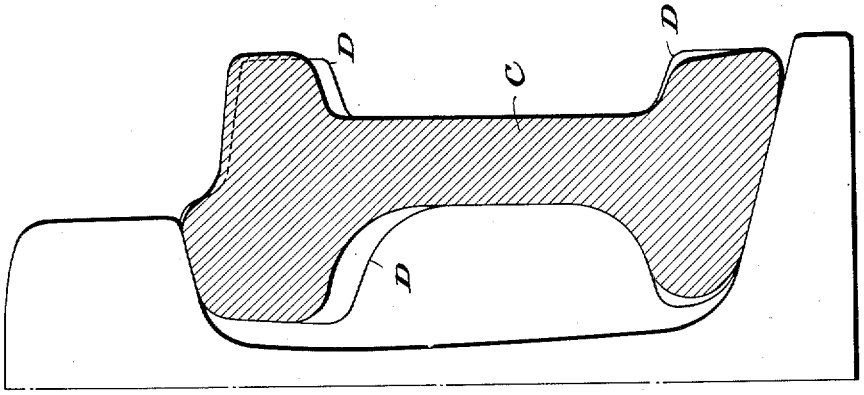
Figure 4 is a similar composite view illustrating the invention in the same way in connection with bars adapted for a lighter weight rail than the rail shown in Figure 3.
Figure 3:
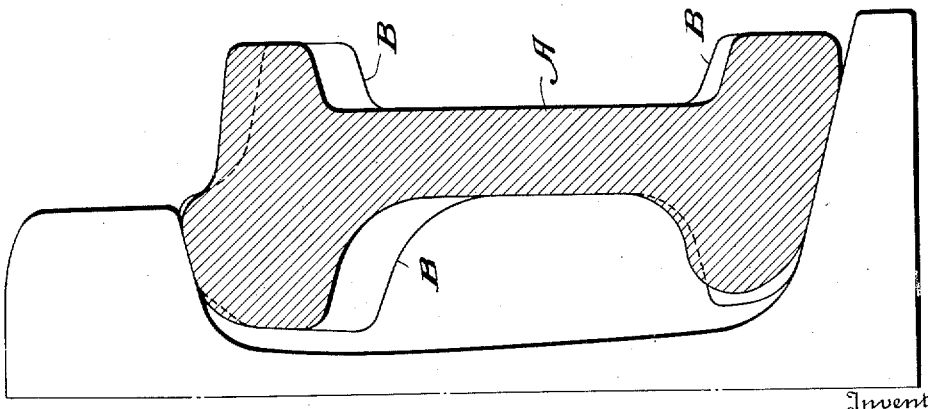
Figure 3 is a composite view showing a bar produced in accordance with the invention superimposed upon a comparable, known splice bar to illustrate, by contrast, the major differences in a bar constructed in accordance with the invention, over a comparable, known bar.

From the calculation figures of the representative bars shown in Figures 3 and 4 of the drawings it will be apparent that the present unbalanced bar, stronger in its head than in its base, is at least as strong as the nearest comparable prior bar and yet includes a materially lesser amount of metal and therefore is far more economical to produce than comparable, known splice bars. For example, a bar constructed in accordance with the invention to fit a 131 lb. rail is illustrated by A in Fig. 3 and the nearest comparable prior splice bar to fit the same rail is illustrated by B in said Figure 3.

The new bar A of Figure 3 developed in accordance with the present invention provides a joint having the following physical properties, to wit:

| | |
|---|---|
| Moment of inertia | 32.3 |
| Top modulus | 12.9 |
| Bottom modulus | 12.1 |

and also the following physical property ratios, to wit:

Above the middle line:

I/S=1.78
S/A=1.51
I/A=2.68

Below the middle line:

I/S=1.80
S/A=1.50
I/A=2.70

The prior known bar B of Figure 3 provides a joint having the following physical properties, to wit:

| | |
|---|---|
| Moment of inertia | 32.2 |
| Top modulus | 12.9 |
| Bottom modulus | 12.2 |

and also the following physical property ratios, to wit:

Above the middle line:

I/S=1.64
S/A=1.38

Below the middle line:

I/S=1.81
S/A=1.54

However, the bar A of Figure 3, developed according to the present invention provides a 24″ joint weighing 81.87 lbs., whereas, the prior bar B of Figure 3 provides a 24″ joint weighing 88.40 lbs. Therefore, the said present bar A is equally as strong as the prior bar B and represents 7.4% saving in metal, thus providing a spread in metal saving which permits the bar A to be made even stronger than the prior bar B and still be less in weight. To further illustrate the comparisons between top and bottom portions of bar A, and top and bottom portions of bar B to show that for a given bar the inertia (I), and area (A), are both materially greater above the middle line than below, and that the neutral axis is disposed materially above the middle line, while maintaining the ratios balanced to provide an economy of metal for bar A over bar B, reference may be made to the following chart:

| | Bar "A" | Bar "B" |
|---|---|---|
| ABOVE MIDDLE LINE | | |
| I | 8.53 | 8.07 |
| A | 3.18″ | 3.56″ |
| Distance of neutral axis above middle line | .09″ | .06″ |
| I/S | 1.78 | 1.64 |
| S/A | 1.51 | 1.38 |
| BELOW MIDDLE LINE | | |
| I | 7.67 | 8.16 |
| A | 2.84″ | 2.94″ |
| I/S | 1.80 | 1.81 |
| S/A | 1.50 | 1.54 |

In the above analysis it will appear that the inertia (I) for the upper portion of bar A is $8.53^{in^4}$ as against $7.67^{in^4}$ for the bottom portion so that the inertia for the top portion is $0.86^{in^4}$ greater than the inertia of the bottom portion.

Hence the moment of inertia for the top portion of the bar is materially greater than the bottom portion. While by the same method of comparison for bar B the moment of inertia is $0.09^{in.^4}$ greater for the bottom portion than the top, just the reverse of bar A. The area of metal for both bars is greater in the top than in the bottom, but the neutral axis of bar A is 0.09'' above the middle line as compared with 0.06'' for bar B, so that the said neutral axis of bar A is materially above the middle line.

In bar A the I/S ratio for the portion of the bar above the middle line is 1.78 while the I/S ratio for the portion of the bar below is 1.80. Likewise in new bar A the S/A ratio above the middle line is 1.51 compared with 1.50 below the middle line. Thus, these I/S and S/A ratios in bar A are substantially in balance.

In the contrary the I/S ratio in old bar B above the middle line is 1.64 as compared with 1.81 below, and, likewise the S/A ratios above and below the middle line in old bar B are, respectively, 1.38 and 1.54, showing that the I/S and S/A ratios in bar B are widely out of balance.

Drawing an overall comparison between the two bars, bar A has materially greater area and moment of inertia above the middle line, its neutral axis materially disposed above said line and the I/S and S/A ratios substantially balanced. Bar B has materially greater area but less moment of inertia above the middle line, its neutral axis disposed above said line and the I/S and S/A ratios are not substantially balanced.

To observe the benefits accruing from a bar designed as is bar A, it is only necessary to compare the physical properties of the two bars, A and B. The joint properties show the same moment of inertia and modulus values for both bars. However, in overall area new bar A is 6.02'' as will be seen from adding the area (A) above (3.18'') and below (2.84'') the middleline; while bar B has an area of 6.50'' by the combining of the area (A) above (3.56'') and below (2.94'') the middle line. Thus, it will be apparent that bar A results in the considerable economy of metal previously described.

Another example of a splice bar constructed in accordance with the present invention to fit 112 lb. rail is illustrated by C in Figure 4 and the nearest comparable prior splice bar is illustrated by D in Figure 4.

The new bar C of Figure 4 developed in accordance with the present invention provides a joint having the following physical properties, to wit:

| | |
|---|---|
| Moment of inertia | 23.2 |
| Top modulus | 10.3 |
| Bottom modulus | 9.6 |

and also the following physical property ratios, to wit:

Above the middle line:

I/S=1.60
S/A=1.35
I/A=2.16

Below the middle line:

I/S=1.61
S/A=1.35
I/A=2.18

The prior known bar D of Figure 4 provides a joint having the following physical properties, to wit:

| | |
|---|---|
| Moment of inertia | 23.6 |
| Top modulus | 10.3 |
| Bottom modulus | 9.9 |

and also the following physical property ratios, to wit:

Above the middle line:

I/S=1.51
S/A=1.29

Below the middle line:

I/S=1.64
S/A=1.38

However, the bar C of Figure 4, developed according to the present invention provides a 24'' joint weighing 73.17 lbs., whereas the prior bar D of Figure 4 provides a 24'' joint weighing 77.75 lbs. Therefore, the said present bar C is equally as strong as the prior bar D and represents a 5.9% saving in metal, thus providing a spread in metal saving which permits the bar C to be made even stronger than the prior bar D and still be less in weight. From the foregoing examples an analysis it will be apparent that Figs. 1 and 2 illustrate a distribution of metal which produces approximately a 10% greater section modulus (S/M) value in the upper portion of the bar than in the bottom portion. Figs. 3 and 4 illustrate another distribution of metal to provide a difference of 0.8 in the top modulus over the bottom modulus. Dividing 0.8 by 12.1 the value of the bottom modulus it will appear that bar A has approximately a 6.6% greater S/M value for the head than the foot. Also, in Fig. 4 the distribution of metal is such as to give 0.7 difference between the top and bottom modulus, which, by following the same procedure just outlined produces approximately a 7.3% greater section modulus value for the portion of the bar above the middle line than that below. Thus, it will be seen that the percentage of difference will vary for different bars, but in the examples given the percentage of difference in the top portion as compared with the bottom portion is materially greater by approximately 7% or approximately 10%.

From the foregoing it will be understood that the present invention provides a splice bar, which, in cross-section, has a greater area of metal above than below its middle line, and, also, that the metal is distributed so that the moment of inertia with respect to said middle line is greater for the portion of the bar above said middle line than for the portion of the bar below said middle line and the horizontal neutral axis of the bar is disposed above said middle line.

In the above connection the greater area of metal in the top portion of the bar, as compared with the metal in the lower portion, has reference to the maximum amount of area greater in the top portion than in the bottom portion of the bar, which produces the maximum preponderance of modulus value for the upper portion of the bar, while maintaining the maximum moment of inertia for a given area, and, at the same time, observing the practical limitation of design imposed by wheel flange clearance, take-up, and bolt and nut clearance. Due to difference in rail sections in general use with respect to finishing, clearances, weight of section, and other factors, the percentage difference in the upper and lower section modulus values for bars made according to the present invention, to suit different rail sections, is not always the same. That is to say, the difference in section modulus valves of joint bars for rails of higher fishing would be greater than for rails of lower fishing. Under these circumstances, and having due regard to bars to fit different rail sections, it is within the teaching of the present invention to provide a metal distribution in a rail joint bar having a greater area of metal above than below its middle line, and wherein the differentials in the range of section modulus values between such areas in the upper and lower portions of the bars, varies with respect to different rails.

For example, simply by way of illustration, bars to fit a 100# rail of a given section would have different section modulus values as compared with a bar to fit a 131# rail, or other rails, as will be apparent from the following :

| Rail | Per cent difference S/M top and bottom of bar |
|---|---|
| 100#-RE | 5.4 |
| 100#-RB | 5.8 |
| 112#-RE | 10.8 |
| 112#-RE | 5.4 |
| 131#-RE | 9.0 |

In short, by constructing a splice bar balanced as to its physical property ratios above and below its middle line and by making said bar stronger in its head than its base, by the method outlined, there is effected a material saving in metal without sacrifice in strength as compared with nearest comparable prior splice bars.

Figure 5:
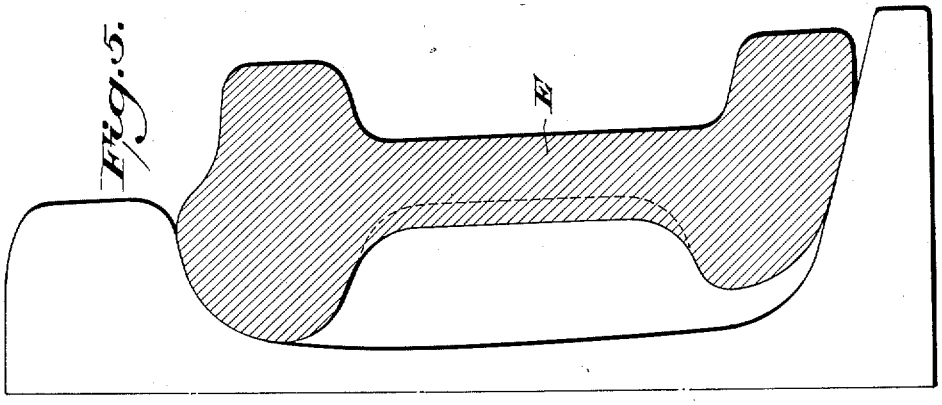
Figure 5 illustrates a modified form of splice bar made in accordance with the present invention adapted to be used with practically the same height and weight of rail as shown in Figure 3, and representing a structure of increased inertia and modulus values over the known standard form of bar shown in Figure 3 and at the same time 6.80 lbs. lighter than said standard known form of bar.

Figure 5 illustrates a modified form of splice bar E made in accordance with the present invention adapted to be used with a modified rail of the same weight as shown in Figure 3 and representing a structure of increased inertia and modulus values over the known standard form of bar shown in Figure 3 and at the same time 6.80 lbs. lighter than said standard known form of bar.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A splice bar including head and foot portions connected by a web and having in cross section, a materially greater area of metal above than below its middle line, and also having its metal distributed so that the moment of inertia with respect to said middle line is materially greater for the portion above the said middle line than for the portion of the bar below the said middle line and the horizontal neutral axis of the bar is disposed materially above said middle line to provide a bar whose section modulus is greater in the head than the foot, said bar having substantially analytical symmetry in that its physical property ratios above and below its middle line are substantially balanced.

2. A splice bar including head and foot portions connected by a web and having in cross section, a materially greater area of metal above than below its middle line and also having its metal distributed so that the moment of inertia with respect to said middle line is materially greater for the portion of the bar above said middle line than for the portion of the bar below said middle line and the horizontal neutral axis of the bar is disposed materially above said middle line to provide a bar whose section modulus is greater in the head than in the foot, said bar having substantially analytical symmetry in that its I/S and S/A ratios above and below its middle line are substantially balanced.

3. A splice bar including head and foot portions connected by a web and having in cross section, a materially greater area of metal above than below its middle line, and also having its metal distributed so that the moment of inertia with respect to said middle line is materially greater for the portion above the said middle line than for the portion of the bar below the said middle line and the horizontal neutral axis of the bar is disposed materially above said middle line to provide a bar whose section modulus is approximately 7% greater in the head than the foot, said bar having substantially analytical symmetry in that its physical property ratios above and below its middle line are substantially balanced.

4. A splice bar including head and foot portions connected by a web and having in cross section, a materially greater area of metal above than below its middle line and also having its metal distributed so that the moment of inertia with respect to said middle line is materially greater for the portion of the bar above said middle line than for the portion of the bar below said middle line and the horizontal neutral axis of the bar is disposed materially above said middle line to provide a bar whose section modulus is approximately 7% greater in the head than in the foot, said bar having substantially analytical symmetry in that its I/S and S/A ratios above and below its middle line are substantially balanced.

5. A splice bar including head and foot portions connected by a web and having in cross section, a materially greater area of metal above than below its middle line, and also having its metal distributed so that the moment of inertia with respect to said middle line is materially greater for the portion above the said middle line than for the portion of the bar below the said middle line and the horizontal neutral axis of the bar is disposed materially above said middle line to provide a bar whose section modulus is approximately 10% greater in the head than the foot, said bar having substantially analytical symmetry in that its physical property ratios above and below its middle line are substantially balanced.

6. A splice bar including head and foot portions connected by a web and having in cross section, a materially greater area of metal above than below its middle line and also having its metal distributed so that the moment of inertia with respect to said middle line is materially greater for the portion of the bar above said middle line than for the portion of the bar below said middle line and the horizontal neutral axis of the bar is disposed materially above said middle line to provide a bar whose section modulus is approximately 10% greater in the head than in the foot, said bar having substantially analytical symmetry in that its I/S and S/A ratios above and below its middle line are substantially balanced.

HORACE L. LANSING.